United States Patent
Higashi

[19]

[11] Patent Number: 6,118,674
[45] Date of Patent: Sep. 12, 2000

[54] POWER SUPPLY APPARATUS FOR SYNCHRONIZING THE OUTPUT VOLTAGES OF A PLURALITY OF POWER SUPPLIES POWERING A SINGLE LOAD

[75] Inventor: Shinya Higashi, Nishitama-gun, Japan

[73] Assignee: Kabushiki Kaisha Toshiba, Kawasaki, Japan

[21] Appl. No.: 09/352,820

[22] Filed: Jul. 13, 1999

[30] Foreign Application Priority Data

Jul. 14, 1998 [JP] Japan .................................. 10-199025

[51] Int. Cl.[7] .................................................. H02M 3/335
[52] U.S. Cl. ................................................. 363/21; 363/71
[58] Field of Search .................................. 363/20, 21, 65, 363/71, 95, 98

[56] References Cited

U.S. PATENT DOCUMENTS

| | | | |
|---|---|---|---|
| 5,008,794 | 4/1991 | Leman | 363/21 |
| 5,638,262 | 6/1997 | Brown | 363/21 |
| 5,671,131 | 9/1997 | Brown | 363/56 |
| 5,862,044 | 1/1999 | Shioya et al. | 363/21 |
| 5,995,387 | 11/1999 | Takahashi et al. | 363/21 |
| 6,014,322 | 1/2000 | Higashi et al. | 363/65 |

*Primary Examiner*—Adolf Deneke Berhane
*Attorney, Agent, or Firm*—Finnegan, Henderson, Farabow, Garrett & Dunner, L.L.P.

[57] ABSTRACT

A power supply apparatus in which at least one or more DC power supply devices having impedance elements with the same impedance on output lines are parallel-connected, and supply output voltages to a common load via the impedance elements includes an external adjustment voltage supply circuit for supplying an adjustable external adjustment voltage to each DC power supply device, and an internal voltage control circuit for comparing the external adjustment voltage from the external adjustment voltage supply circuit incorporated in each DC power supply device with the voltage applied to each impedance element, and controlling the output voltage so as to make these voltages equal, thereby equalizing voltages applied to the impedance elements in the respective DC power supply devices.

6 Claims, 3 Drawing Sheets

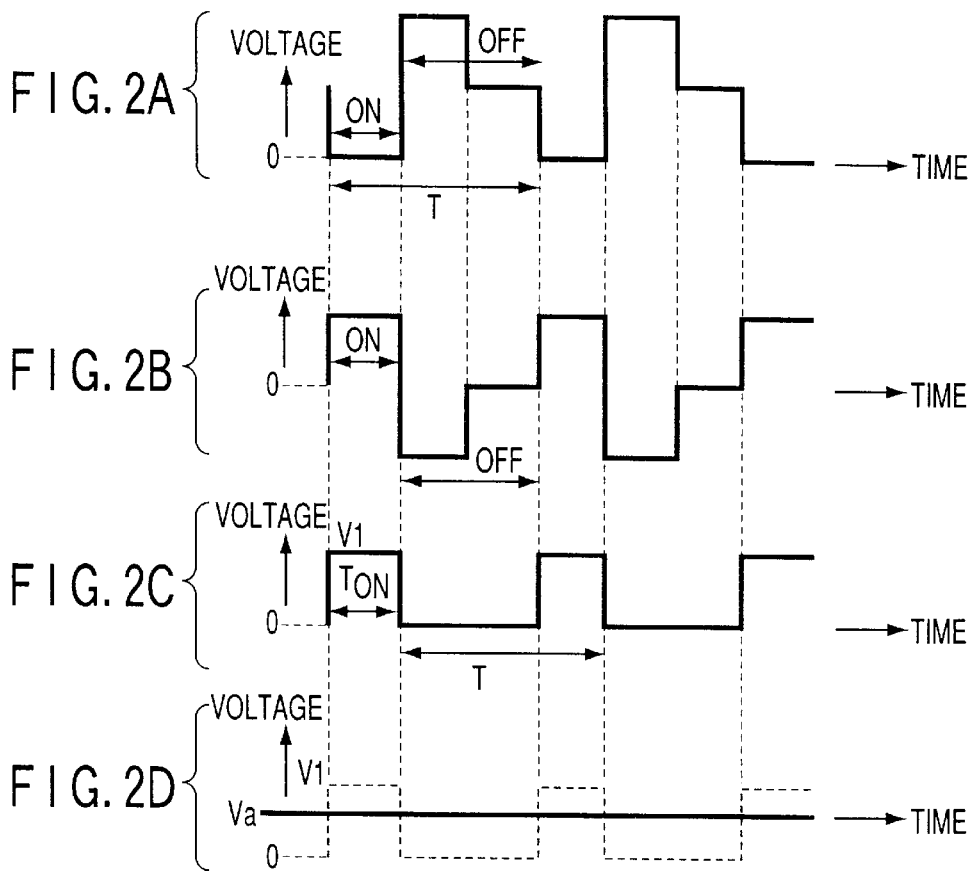
FIG. 2A
FIG. 2B
FIG. 2C
FIG. 2D
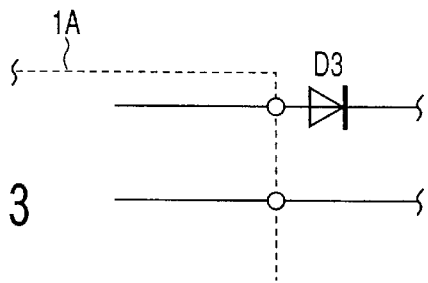
FIG. 3
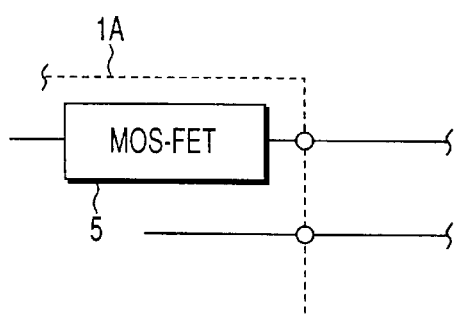
FIG. 4
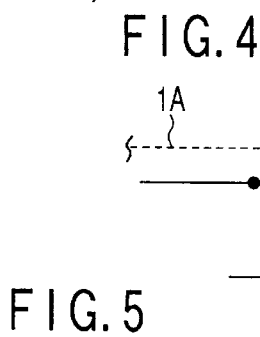
FIG. 5

POWER SUPPLY APPARATUS FOR SYNCHRONIZING THE OUTPUT VOLTAGES OF A PLURALITY OF POWER SUPPLIES POWERING A SINGLE LOAD

BACKGROUND OF THE INVENTION

The present invention relates to a power supply apparatus for supplying power to a load and, more particularly, to a power supply apparatus in which a plurality of DC power supplies may be added in order to supply power to a single load.

FIG. 6 is a circuit diagram showing the arrangement of a conventional power supply apparatus of this type.

This power supply apparatus comprises many DC power supply devices 21A, 21B, ..., 21N (N is a positive integer) for supplying power to a load R. These DC power supply devices 21A, 21B, ..., 21N have the same arrangement.

The schematic arrangement of the DC power supply device 21A will be exemplified.

The DC power supply device 21A uses a DC voltage from a power supply E as a switching voltage based on switching operation of a switching transistor Q1, and supplies this switching voltage to the primary winding of a transformer T1. A voltage induced on the secondary winding is rectified by diodes D1 and D2 as rectifiers, and smoothened by a smoothing coil L1 and smoothing capacitor C1. The smoothened voltage is output as an output voltage V0 via a diode D3. This output voltage V0 is supplied to the load R.

The DC power supply device 21A also has a pulse width modulation (PWM) controller 10 for controlling switching operation of the switching transistor Q1. The PWM controller 10 is controlled by an internal output voltage control circuit 11 to adjust the output voltage V0.

The internal output voltage control circuit 11 changes the ON width of the switching transistor Q1 by the PWM controller 10 under the control of an output current from a photo-coupler PC1 by an output control element IC12. The internal output voltage control circuit 11 has the photo-coupler PC1 made up of a combination of a light-emitting diode PD1 and photo-transistor QP connected to the positive electrode of the smoothing capacitor C1, a resistor R13 connected between the photo-coupler PC1 and ground, and the output control element IC12.

The internal output voltage control circuit 11 further comprises a series circuit of a voltage adjustment rheostat VR11 and resistors R11 and R12 series-connected between the anode of the light-emitting diode PD1 in the photo-coupler PC1 and ground, and a coupling capacitor C12 connected between the node of the resistors R11 and R12 and the node of the resistor R13 and output control element IC12. Note that the node of the resistors R11 and R12 is connected to the gate electrode of the output control element IC12.

The remaining DC power supply devices 21B, ..., 21N have the same arrangement as the DC power supply device 21A.

In the conventional power supply apparatus shown in FIG. 6, the output voltage adjustment rheostats VR11 incorporated in the DC power supply devices 21A, 21B, ..., 21N independently adjust their output voltages V0. Hence, if the output voltages from the DC power supply devices 21A, 21B, ..., 21N are different in the conventional power supply apparatus, their output currents are also different.

To prevent this, the conventional power supply apparatus requires a current balancing circuit in addition to the internal output voltage control circuit 11 when two or more of the DC power supply devices 21A, 21B, ..., 21N parallelly operate. This complicates the whole arrangement of the power supply circuit.

Moreover, each DC power supply device requires an internal output voltage control circuit 11. The occurrence probability of an overvoltage fault of the output voltage V0 or the like becomes twice the number of DC power supply devices, and the possibility of the debilitation of the entire power supply apparatus increases.

BRIEF SUMMARY OF THE INVENTION

The present invention has been made in consideration of the above situation, and has as its object to provide a power supply apparatus which has a simple circuit arrangement not requiring any current balancing circuit or the like, can appropriately adjust current balance with a simple operation, and is least likely to cause any fault.

A power supply apparatus of the present invention comprises external adjustment voltage supply means for outputting an adjustable external adjustment voltage, and at least one DC power supply device which can be increased to a predetermined number of DC power supply devices, the DC power supply device having impedance means having the same impedance between the respective DC power supply devices, a power supply, and internal voltage control means for receiving the external adjustment voltage from the external adjustment voltage supply means, and controlling an output voltage from the power supply so as to make a voltage on an input stage of the impedance means equal to the external adjustment voltage.

According to the present invention, a single external adjustment voltage supply means supplies an adjustable external voltage to each DC power supply device. The internal voltage control means incorporated in each DC power supply device compares the external adjustment voltage with a voltage on the input stage of the impedance means, and controls the output voltage so as to make these voltages equal. This can make the voltages applied to the impedance means in the respective DC power supply devices equal to thereby make the output currents from these DC power supply devices equal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a graph showing the voltage characteristic on the primary winding of a transformer T1 in the power supply apparatus of this embodiment;

FIG. 2B is a graph showing the voltage characteristic on the secondary winding of the transformer T1 in the power supply apparatus of this embodiment;

FIG. 2C is a graph showing the voltage characteristic on a circuit in the power supply apparatus of this embodiment after rectification;

FIG. 2D is a graph showing the voltage characteristic on a circuit in the power supply apparatus of this embodiment after smoothing;

FIG. 3 is a circuit diagram showing an example of connecting a diode to an output line outside a DC power supply device in the power supply apparatus of this embodiment;

FIG. 4 is a circuit diagram showing an example of connecting a MOS-FET to an output line in the power supply apparatus of this embodiment;

FIG. 5 is a circuit diagram showing an example of connecting a wire to an output line in the power supply apparatus of this embodiment.

DETAILED DESCRIPTION OF THE INVENTION

An embodiment of the present invention will be described below with reference to the several views of the accompanying drawing.

Figure 1:
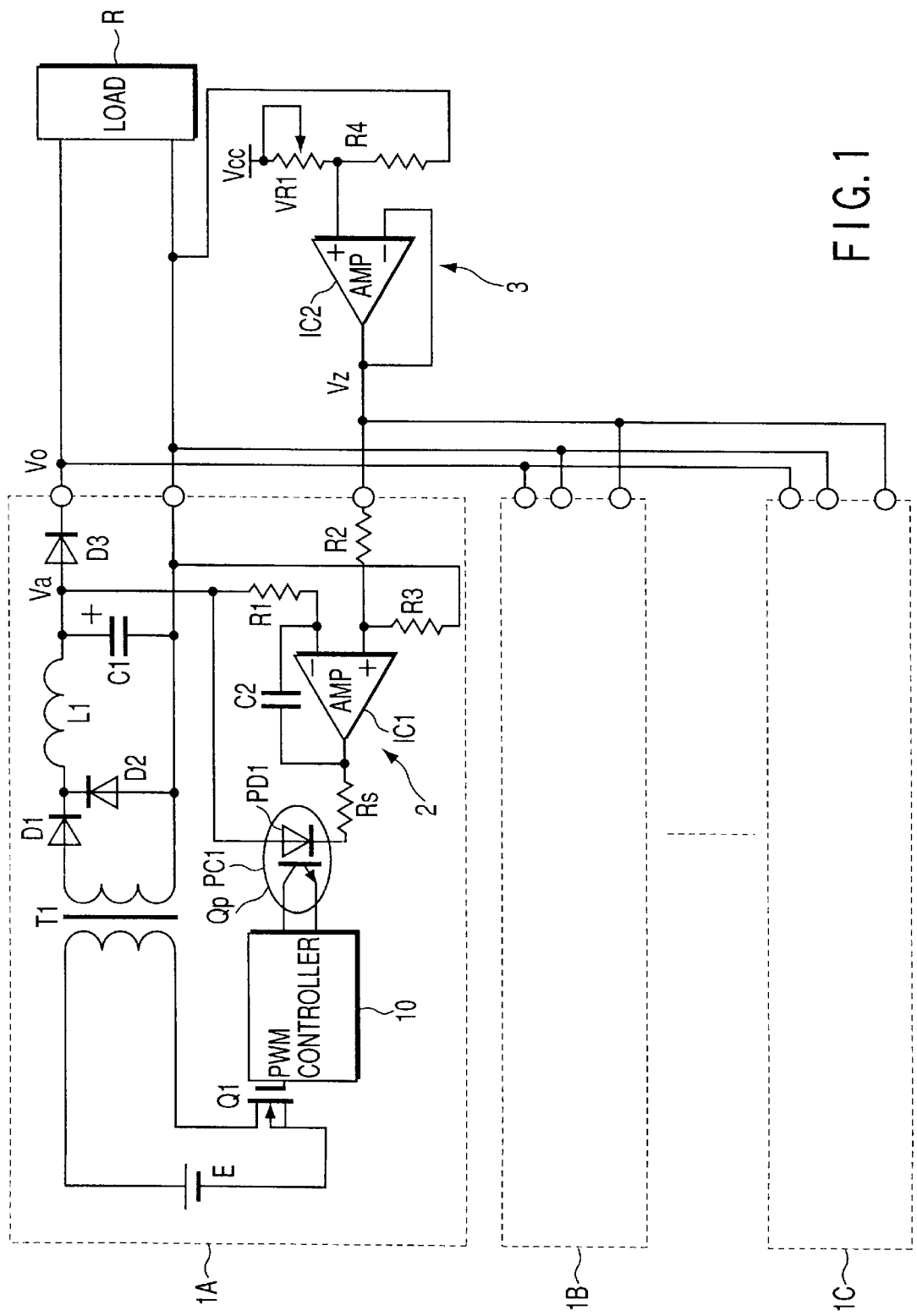
FIG. 1 is a block diagram showing the schematic arrangement of a power supply apparatus according to an embodiment of the present invention.
Figure 6:
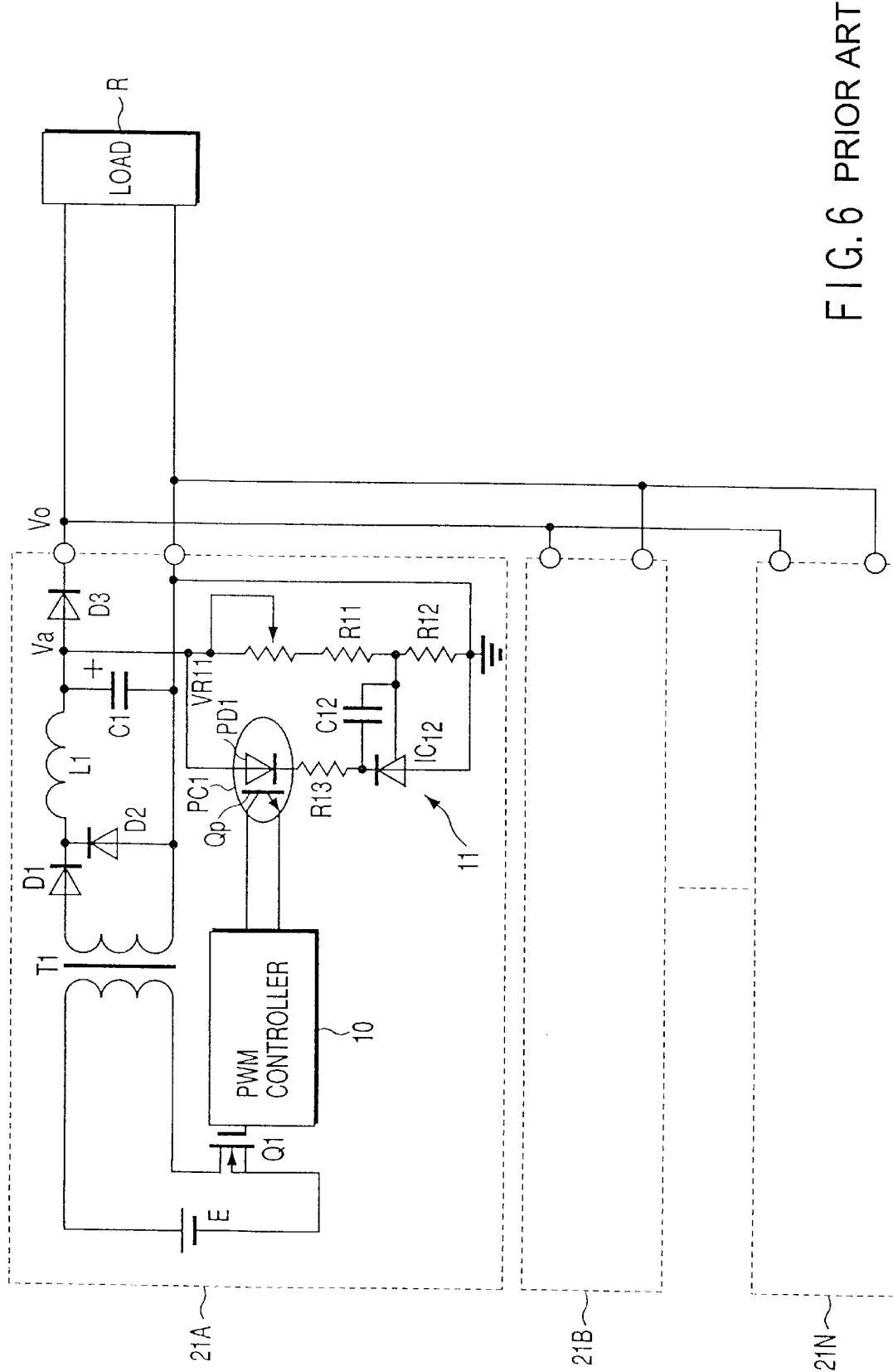
FIG. 6 is a circuit diagram showing the arrangement of a conventional power supply apparatus.

FIG. 1 is a circuit diagram showing the arrangement of a power supply apparatus according to an embodiment of the present invention.

This power supply apparatus comprises many DC power supply devices 1A, 1B, . . . , 1N (N is a positive integer) for supplying power to a load R. These DC power supply devices 1A, 1B, . . . , 1N have the same arrangement. The power supply apparatus further comprises one external adjustment voltage supply circuit 3 for supplying an external adjustment voltage Vz for adjusting the voltages from the DC power supply devices 1A, 1B, . . . , 1N.

The schematic arrangement of the DC power supply device 1A will be exemplified.

The DC power supply device 1A uses a DC voltage from a power supply E as a switching voltage based on switching operation of a switching transistor Q1, and supplies this switching voltage to the primary winding of a transformer T1. A voltage induced on the secondary winding is rectified by diodes D1 and D2 as rectifiers, and smoothened by a smoothing coil L1 and smoothing capacitor C1. The smoothened voltage is output as an output voltage V0 via a diode D3. The output voltage V0 is supplied to the load R. The diode D3 is an indispensable component to adjust current balance in the present invention, and also to prevent the inflow (back flow) of a current from another DC power supply device.

The DC power supply device 1A comprises a pulse width modulation (PWM) controller 10 for controlling switching operation of the switching transistor Q1. The PWM controller 10 is controlled by an internal voltage control circuit 2 to adjust the output voltage V0.

The internal voltage control circuit 2 comprises a photo-coupler PC1 made up of a combination of a light-emitting diode PD1 and phototransistor QP connected to the anode electrode of the diode D3 on the output line, a first operational amplifier IC1 for receiving a voltage Va from the anode electrode of the diode D3 on the output line via a resistor R1 at an inverting input terminal and receiving the external adjustment voltage Vz from the external adjustment voltage supply circuit 3 via a resistor R2 at a non-inverting input terminal, and a capacitor C2 connected between the inverting input terminal and output terminal of the first operational amplifier IC1. The photo-coupler PC1 transfers an optical signal to properly prevent an electric shock. Note that the transformer T1 also properly prevents an electric shock.

The first operational amplifier IC1 compares the voltage Va with the external adjustment voltage Vz, and operates to make them equal. By this operation, a current flowing through the light-emitting diode PD1 via a resistor Rs serves as a control current to the PWM controller 10 via the photo-coupler PC1.

A resistor R3 serving as a voltage control element for preventing output of an abnormal voltage by decreasing the output voltage V0 (to 0V) when no external adjustment voltage Vz is input from the external adjustment voltage supply circuit 3 is connected between the negative side of the output line and the inverting input terminal of the first operational amplifier IC1.

The remaining DC power supply devices 1B, . . . , 1N have the same arrangement as the DC power supply device 1A. Note that the power supply apparatus in this embodiment comprises N DC power supply devices from the beginning. Instead, for example, the power supply apparatus may comprise only one DC power supply device initially (e.g., shipment), and the number of DC power supply devices may be subsequently increased to N.

In the external adjustment voltage supply circuit 3, a rheostat VR1 and resistor R4 are series-connected between the negative side of the output line and a voltage terminal which receives a predetermined DC voltage Vcc. The predetermined voltage is supplied from the node of the rheostat VR1 and resistor R4 to the non-inverting input terminal of a second operational amplifier IC2, and the external adjustment voltage Vz output from the output terminal of the second operational amplifier IC2 is fed back to its inverting input terminal.

For example, the external adjustment voltage Vz supplied from the output terminal to the respective DC power supply devices 1A, 1B, . . . , 1N can be adjusted by adjusting the rheostat VR1 by an operator.

Operation of the power supply apparatus having the above arrangement according to this embodiment will be explained.

An operator adjusts the rheostat VR1 to input the external adjustment voltage Vz from the external adjustment voltage supply circuit 3 to the DC power supply devices 1A, 1B, . . . , 1N. The external adjustment voltage Vz and the voltage Va from the anode electrode of the external adjustment voltage supply circuit 3 are supplied to the first operational amplifier IC1 of the internal voltage control circuit 2, and compared with each other. The internal voltage control circuit 2 controls the PWM controller 10 so as to attain Va=Vz. Under this control, the PWM controller 10 changes the ON width of the switching element Q1.

FIGS. 2A to 2D are graphs showing the voltage waveforms at the respective points on the output line extending from the power supply E to the diode D3.

The voltage of the power supply E switched by the transistor Q1 is input to the transformer T1. FIG. 2A shows the voltage waveform on the primary winding side of the transformer T1, and FIG. 2B shows the voltage waveform on the secondary winding side. T in FIG. 2A represents the switching period of the transistor Q1. When the transistor Q1 is ON during the switching period T, a predetermined-level voltage is obtained on the secondary winding side; when the transistor Q1 is OFF, the voltage on the secondary winding side is 0.

FIG. 2C shows a voltage waveform after the voltage obtained on the secondary side of the transformer T1 is rectified by the diodes D1 and D2. The rectified voltage is smoothened by the smoothing coil L1 and smoothing capacitor C1, as shown in FIG. 2D. The smoothened voltage Va is Va≈V1×Ton/T, and changes in accordance with a change in ON width of the switching element Q1.

As described above, the internal voltage control circuit 2 controls the PWM controller 10 so as to attain Va=Vz, and the PWM controller 10 changes the ON width of the switching element Q1 under this control. Accordingly, voltages Va applied to the diodes D3 in the DC power supply devices 1A, 1B, . . . , 1N are adjusted to agree with each other based on one external adjustment voltage Vz. More specifically, all the voltages Va of the anode electrodes in the DC power supply devices 1A, 1B, . . . , 1N are equal.

Further, the output currents from the DC power supply devices 1A, 1B, . . . , 1N are also equalized by making the impedances of the diodes D3 on the output line equal.

More specifically, letting Va1, . . . , Van, and Rd1, . . . , Rdn be the voltage parameters and impedance parameters of the DC power supply devices 1A, . . . , 1N, the respective output currents can be calculated as follows (the output voltage V0 is common).

That is, the output current from the DC power supply device 1A=(Va1−V0)/Rd1, and the output current from the DC power supply device 1N=(Van−V0)/Rdn.

Since Va1 and Van are controlled to be the external adjustment voltage Vz, Va1=Van=Vz.

Since the DC power supply devices 1A and 1N use elements having the same impedance or elements adjusted to have the same impedance, Rd1=Rdn. Under these conditions, the output current from the DC power supply device 1A=the output current from the DC power supply device 1N=(Vz−V0)/Rd1 (or =(Vz−V0)/Rdn). As a result, the output currents from the plurality of parallel-connected DC power supply devices 1A, . . . , 1N are unified.

Current balance can, therefore, be appropriately adjusted between the DC power supply devices 1A, 1B, . . . , 1N without adding any current balancing circuit.

If the value of the external adjustment voltage Vz is changed by adjusting the rheostat VR1 of the external adjustment voltage supply circuit 3, like this embodiment, the internal voltage control circuit 2 of each DC power supply device can operate to change the output voltage V0 supplied to the load R. In other words, the output voltage can be adjusted with a simple operation of adjusting one rheostat VR1. No adjustment need be done in each DC power supply device, unlike the conventional power supply apparatus, and no adjustment variations occur.

FIG. 3 shows an example of the diode D3 on the output line that is externally connected to the DC power supply device 1A. Even when the diode D3 is adopted as a component separate from the DC power supply device 1A, currents can be made equal so long as the voltages from the anode electrodes of the diodes D3 serving as impedance elements are equal between the DC power supply devices.

Even if all the DC power supply devices 1A, . . . , 1N do not have the same circuit arrangement, currents can be equalized as far as the voltages from the impedance elements connected to the respective output lines are equal. Thus, the power supply apparatus can use DC power supply devices 1A, . . . , 1N having different circuit arrangements.

FIG. 4 shows an example of using a MOS-FET 5 in place of the diode D3 on the output line. This example can also attain the same operation effects as the case of using the diode D3.

FIG. 5 shows an example of using a wire 6 having the same impedance as the diode D3. A PWB (printed wiring board) wiring pattern may replace the wire 6. The arrangement using the wire line 6 or wiring pattern can also attain the same operation effects as the case of using the diode D3.

Even if no external adjustment voltage Vz is input from the external adjustment voltage supply circuit 3 to the internal voltage control circuit 2, the resistor R3 operates to prevent the voltage at the non-inverting input terminal of the first operational amplifier IC1 from dropping to 0. The internal voltage control circuit 2 operates to decrease the output voltage V0, thereby preventing generation of an abnormal voltage such as an excessive output voltage V0.

As has been described above, the present invention can provide a power supply apparatus which has a simple circuit arrangement not requiring any current balancing circuit or the like, can appropriately adjust current balance with a simple operation, and is least likely to cause any fault.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power supply unit comprising:
    a plurality of parallel-connected DC power supply devices, for driving a load by parallel outputs of the DC power supply devices, each of said plurality of DC power supply devices comprising:
        a power supply;
        an impedance element connected to said power supply, and having the same impedance as that of the DC power supply devices;
        an internal voltage control circuit for receiving an external adjustment voltage, and controlling an output voltage from said power supply so as to make a voltage on an input stage of said impedance element equal to said external adjustment voltage;
    an external voltage supply device connected to said plurality of DC power supply devices, for supplying the same adjustment voltage to said plurality of DC power supply devices; and
    a circuit provided in said external adjustment voltage supply device for varying said external adjustment voltage.

2. The power supply unit according to claim 1, wherein said impedance element includes a diode or MOS-FET.

3. The power supply apparatus according to claim 1, wherein said impedance element is arranged outside said DC power supply device.

4. The power supply apparatus according to claim 1, wherein said impedance element comprises a wire or part of a wiring pattern for a wiring board.

5. The power supply apparatus according to claim 1, further comprising a circuit for decreasing an output voltage from said DC power supply device when no external adjustment voltage is input from said external adjustment voltage supply device to said internal voltage control device.

6. The power supply apparatus according to clam 1, wherein the number of said DC power supply devices is incremental from one to a predetermined number in accordance with the installation of the devices.

* * * * *